UNITED STATES PATENT OFFICE.

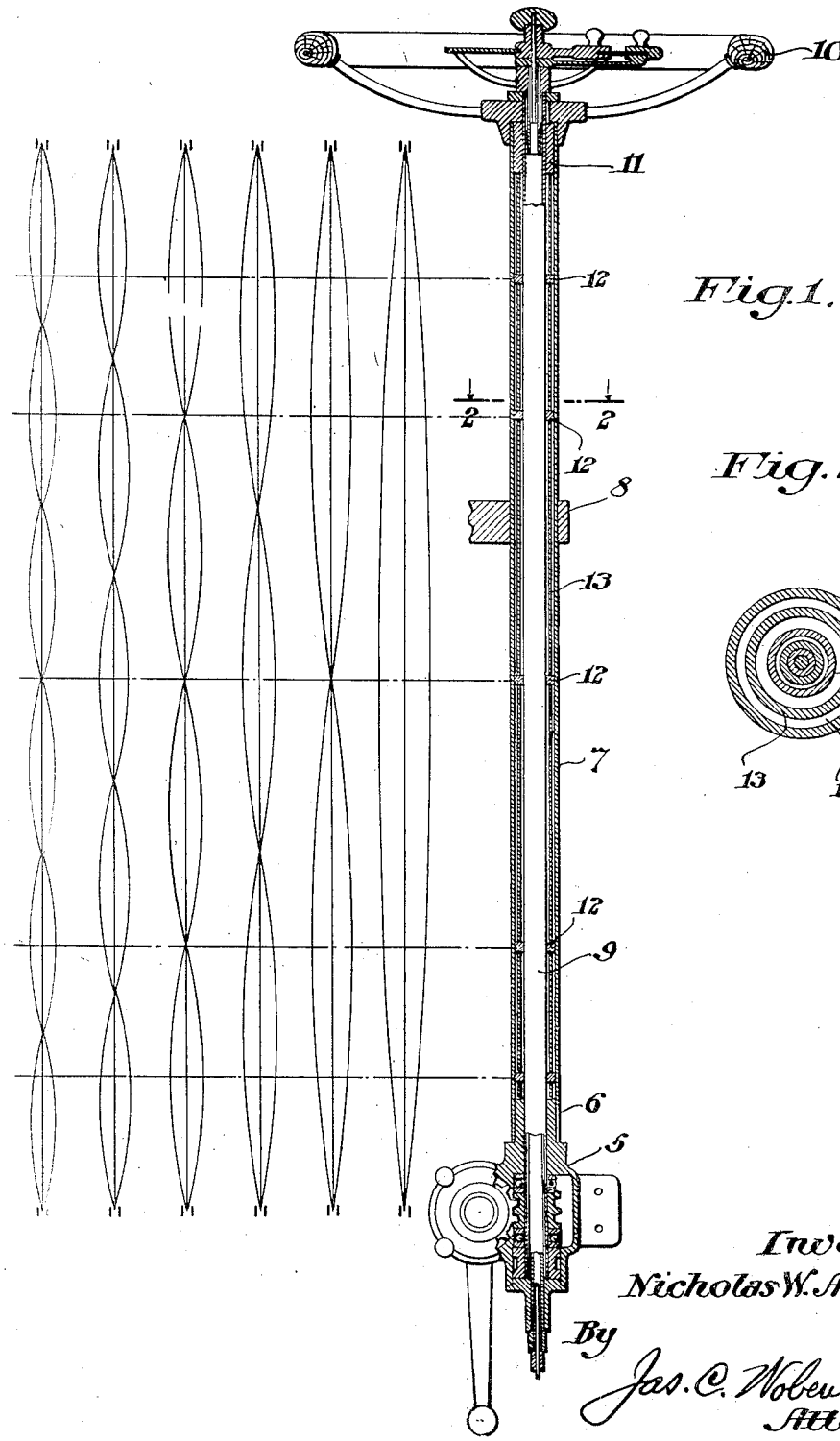

NICHOLAS W. AKIMOFF, OF WYNNEWOOD, PENNSYLVANIA, ASSIGNOR TO VIBRATION SPECIALTY COMPANY, OF PHILADELPHIA, PENNSYLVANIA, A CORPORATION OF DELAWARE.

STEERING-COLUMN FOR AUTOMOTIVE APPARATUS.

1,380,338.　　　　Specification of Letters Patent.　　Patented June 7, 1921.

Application filed October 19, 1920. Serial No. 418,036.

*To all whom it may concern:*

Be it known that I, NICHOLAS W. AKIMOFF, a citizen of the United States, residing at Wynnewood, in the county of Montgomery and State of Pennsylvania, have invented certain new and useful Improvements in Steering-Columns for Automotive Apparatus, of which the following is a specification.

My invention relates to steering columns for automotive apparatus, and it relates more particularly to means for minimizing the vibration in such devices. The object of my invention is to provide rationally arranged means for minimizing or substantially eliminating transmitted vibration in steering columns of automotive apparatus, such as automobiles, motor boats and aeroplanes.

The nature and characteristic features of my invention will be more readily understood from the following description taken in connection with the accompanying drawings forming part hereof, in which—

Figure 1 is a longitudinal central sectional view of a steering column for automotive apparatus embodying the main features of my present invention, and showing in connection therewith diagrams of the fundamental mode of vibration and its principal harmonics, and Fig. 2 is a transverse section taken on the line 2—2 of Fig. 1.

Referring to the drawings, in the particular embodiment of my invention therein shown, 5 is the usual base casting of the steering column which is secured to some portion of the frame of the automotive apparatus, such as the chassis of an automobile or aeroplane, or to some part of the framing in the case of a motor boat. The casting 5 constitutes a support for the steering column as well as providing a bearing for the mechanism for transmitting the useful movement of the steering wheel to the other portions of the steering gear of the apparatus.

Mounted on a suitable extension 6 of the base casting 5 is the tubular casing 7 of the steering column, which may, if desired, be supported intermediate its ends by means of a suitable bracket 8 extending from the dashboard or other part of the automotive apparatus in connection with which the steering column is used. The base casting 5 also supports the lower end of the steering post 9, which is concentrically located within the casing 7, and which carries the steering wheel 10, suitably secured to the upper end thereof. The steering post 9 is supported, to a certain extent, at the upper end of the casing 7, by means of a bushing 11, preferably made of cork or other suitable material.

It will thus be seen that the steering post 9 is supported, more or less, at each end, and therefore is ordinarily inclined to vibrate in a fundamental mode, having nodes at each end and an antinode at the center, as well as in the modes which are harmonics of the fundamental, having antinodes at certain determinable locations. Vibration in these modes will be induced by the complex vibration transmitted from the engine, or other prime mover of the automotive apparatus, and will be manifested most forcibly when the period of transmitted vibration synchronizes with the period of normal vibration of the steering post 9, at which time the same will be quite objectionably apparent to the operator controlling the steering wheel 10.

It should be understood that the normal period of free vibration of the steering post 9 is ordinarily non-synchronous with the normal period of vibration of the surrounding casing 7, and it is a well known law of physics that if an obstacle be placed at the point where antinodes occur in the vibration of an elongated member, such as the steering post of an automotive apparatus, the mode of vibration in which this point is an antinode will be eliminated, although any mode of vibration where the point under consideration is a node will still be possible. My present invention, therefore, contemplates the provision of devices so located in the longitudinal extension of the steering post 9 as to constitute, in conjunction with the surrounding casing, obstacles which will be located at points where the antinodes of the fundamental mode occur, as well as where the antinodes of the principal harmonics of such mode occur, such obstacles being provided in numbers sufficient to effectually accomplish the desired purpose.

There are therefore provided, a plurality of washers 12, suitably located at positions where would occur antinodes of the fundamental and its principal harmonics, namely, there will be located one of such washers 12 at a position approximately the center of the length of the steering post; there will be provided preferably two of such washers at the quarter divisions of the length; and two or more of such washers will be located at positions corresponding to one-eighth divisions of the length of the steering post. The washers 12 are positioned by means of suitable sleeves 13, preferably made of sheet fiber and of such lengths as to properly position the washers 12 as above set forth, these sleeves being located in the annular space between the steering post 9 and the surrounding casing 7.

The washers 12 are preferably made of fiber or other suitable material, fitted snugly between the steering post 9 and the surrounding casing 7, so that when the vibration is transmitted from the engine or other vibration-inducing cause, there will be provided obstacles located at such positions as to repress such vibration at the antinode of the fundamental mode as well as the principal harmonics thereof, namely: the washer which is located at the center will serve to prevent the vibration which would occur in the fundamental mode as well as all the harmonics thereof having an odd number of antinodes, and which therefore have antinodes at the center; the washers which are located at the quarter points will suppress vibration in the harmonic having two antinodes, and also in the harmonic having six antinodes, and the washers which are located at the eight points will suppress the vibration in the harmonic having four antinodes.

It should be understood that it will not always be necessary to provide as many of the obstacles as are above set forth. In many instances, it will be necessary only to suppress the vibration in the fundamental mode and its first and second harmonics, or even, in some instances, it will be necessary only to suppress the fundamental merely, and it should also be understood that it is not necessary to supply such obstacles at all of the antinodes of any particular harmonic mode which it is desirable to suppress, and ordinarily it will be sufficient to provide but two points of suppression, located at any preferred two of the antinodes of any of the particular harmonic modes to be suppressed.

It will be seen that there is thus provided rationally arranged means for minimizing vibration in the steering column of automotive apparatus, which may be inexpensively constructed and arranged, and which is adaptable for use in steering columns of ordinary type.

Having thus described the nature and characteristic features of my invention, what I claim as new and desire to secure by Letters Patent, is:

1. In a steering column for automotive apparatus having a steering post, the means for minimizing transmitted vibration comprising a member bearing against the steering post at the point where the antinode of the fundamental mode of vibration of the steering post occurs.

2. In a steering column for automotive apparatus having a steering post, the means for minimizing transmitted vibration comprising a plurality of members bearing against the steering post at points where occur the antinodes of the fundamental mode of vibration of the steering post and the principal harmonics thereof.

3. In a steering column for automotive apparatus having a steering post and a surrounding casing, the means for minimizing transmitted vibration comprising a plurality of washers interposed between the steering post and the surrounding column.

4. In a steering column for automotive apparatus having a steering post and a surrounding casing, the means for minimizing transmitted vibration comprising a plurality of washers interposed between the steering post and the surrounding column, and means for positioning said washers.

5. In a steering column for automotive apparatus having a steering post and a surrounding casing, the means for minimizing transmitted vibration comprising a plurality of washers interposed between the steering post and the surrounding column, and sleeves arranged in the annular space between said steering post and surrounding column for positioning said washers.

6. In a steering column for automotive apparatus having a steering post and a surrounding casing, the means for minimizing transmitted vibration comprising a washer interposed between the steering post and the surrounding column and located at the point where the antinode of the fundamental mode of vibration of the steering post occurs.

7. In a steering column for automotive apparatus having a steering post and a surrounding casing, the means for minimizing transmitted vibration comprising a plurality of washers interposed between the steering post and the surrounding column and located at points where occur the antinodes of the fundamental mode of vibration of the steering post and the principal harmonics thereof.

8. In a steering column for automotive apparatus having a steering post and a surrounding casing, the means for minimizing transmitted vibration comprising a plurality of washers interposed between the steering post and the surrounding column and located at points where occur the antinodes of the fundamental mode of vibration of the steering post and the principal harmonics thereof, and means for positioning said washers.

9. In a steering column for automotive apparatus having a steering post and a surrounding casing, the means for minimizing transmitted vibration comprising a plurality of washers interposed between the steering post and the surrounding column and located at points where occur the antinodes of the fundamental mode of vibration of the steering post and the principal harmonics thereof, and sleeves arranged in the annular space between said steering post and surrounding column for positioning said washers.

In testimony whereof, I have hereunto signed my name.

NICHOLAS W. AKIMOFF.